United States Patent
Hensel et al.

(10) Patent No.: US 9,380,919 B2
(45) Date of Patent: Jul. 5, 2016

(54) METHOD FOR CLEANING A FILTER OF A VACUUM CLEANER AND VACUUM CLEANER FOR PERFORMING THE METHOD

(71) Applicant: Alfred Kärcher GmbH & Co. KG, Winnenden (DE)

(72) Inventors: Maic Hensel, Backnang (DE); Julien Scholl, Waiblingen (DE); Frank Fuchs, Rutesheim (DE); Ulrich Engenhardt, Stuttgart (DE); Britt Wirbel, Waiblingen (DE); Steffen Kunz, Winnenden (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 184 days.

(21) Appl. No.: 13/960,250

(22) Filed: Aug. 6, 2013

(65) Prior Publication Data
US 2013/0312792 A1    Nov. 28, 2013

Related U.S. Application Data

(63) Continuation of application No. PCT/EP2011/052039, filed on Feb. 11, 2011.

(51) Int. Cl.
| | | |
|---|---|---|
| *A47L 9/20* | (2006.01) | |
| *B08B 5/04* | (2006.01) | |
| *B01D 46/04* | (2006.01) | |
| *A47L 9/28* | (2006.01) | |

(Continued)

(52) U.S. Cl.
CPC .............. *A47L 9/2884* (2013.01); *A47L 9/20* (2013.01); *A47L 9/2842* (2013.01); *B01D 46/0067* (2013.01); *B08B 5/04* (2013.01); *F16K 17/042* (2013.01)

(58) Field of Classification Search
CPC ....... A47L 9/20; A47L 9/2842; A47L 9/2889; A47L 9/1666; A47L 9/1683; B08B 5/00; B08B 5/04; B01D 46/0067; B01D 46/0068
See application file for complete search history.

(56) References Cited

U.S. PATENT DOCUMENTS

| | | |
|---|---|---|
| 6,192,550 B1 | 2/2001 | Hamada et al. |
| 7,976,614 B2 | 7/2011 | Eckstein et al. |

(Continued)

FOREIGN PATENT DOCUMENTS

| | | |
|---|---|---|
| CN | 1323565 | 11/2001 |
| EP | 0955003 | * 11/1999 |

(Continued)

*Primary Examiner* — Saeed T Chaudhry
(74) *Attorney, Agent, or Firm* — Womble Carlyle Sandridge & Rice LLP (57) ABSTRACT

A method is provided for cleaning at least one filter of a vacuum cleaner, wherein the vacuum cleaner comprises a suction inlet and a dirt collection container, which can be subjected to negative pressure by a suction unit via the at least one filter and a suction extraction line, and wherein for cleaning purposes the at least one filter can be acted upon by external air on the clean side via at least one external air valve, which moves from a closed valve position via an open valve position back into the closed valve position for cleaning the at least one filter. So that the at least one filter can be cleaned particularly effectively, the suction power of the suction unit can be increased before transfer of the external air valve to the open valve position and reduced again later. A vacuum cleaner for performing the method is also provided.

21 Claims, 4 Drawing Sheets

(51) Int. Cl.
 *B01D 46/00* (2006.01)
 *F16K 17/04* (2006.01)

(56) References Cited

U.S. PATENT DOCUMENTS

| | | |
|---|---|---|
| 2008/0086835 A1* | 4/2008 | Stewen et al. .................. 15/347 |
| 2008/0092326 A1 | 4/2008 | Morishita |
| 2008/0092498 A1* | 4/2008 | Stewen et al. .................. 55/283 |
| 2009/0000485 A1 | 1/2009 | Valentini |
| 2009/0205491 A1 | 8/2009 | Eckstein et al. |

FOREIGN PATENT DOCUMENTS

| | | |
|---|---|---|
| EP | 1 410 751 | 4/2004 |
| JP | 2003-339598 | 12/2003 |
| JP | 2008-061900 | 3/2008 |
| JP | 2009-225993 | 10/2009 |
| JP | 2010-273821 | 12/2010 |
| WO | WO 2011/012479 | 2/2011 |

* cited by examiner

METHOD FOR CLEANING A FILTER OF A VACUUM CLEANER AND VACUUM CLEANER FOR PERFORMING THE METHOD

CROSS-REFERENCE TO RELATED APPLICATIONS

The present application is a continuation of international application number PCT/EP2011/052039, filed on Feb. 11, 2011, which is incorporated herein by reference in its entirety and for all purposes.

BACKGROUND OF THE INVENTION

The invention relates to a method for cleaning at least one filter of a vacuum cleaner, wherein the vacuum cleaner comprises a suction inlet and a dirt collection container, which is in flow connection with a suction unit via the at least one filter and a suction extraction line, and which can be subjected to negative pressure by the suction unit, and wherein for cleaning purposes the at least one filter can be acted upon by external air on the clean side via at least one external air valve, which moves from a closed valve position to an open valve position and back again into the closed valve position for cleaning the at least one filter.

The invention also relates to a vacuum cleaner for performing the method.

A vacuum cleaner of the kind mentioned at the outset comprises a suction inlet to which, for example, a suction hose is connectable in the usual manner. The suction inlet is in flow connection with the dirt collection container. It may, for example, be provided that the suction inlet opens directly into the dirt collection container or is in flow connection with it via an inlet line. The dirt collection container, in turn, can be subjected to negative pressure by the suction unit. For this purpose, the dirt collection container is in flow connection with the suction unit via at least one filter and a suction extraction line. By subjecting the dirt collection container to negative pressure, a suction flow can be created, under the action of which suction air laden with dirt can be sucked into the dirt collection container and then emitted to the environment again by the suction unit via the at least one filter and the suction extraction line. The at least one filter is arranged in the flow path between the dirt collection container and the suction unit, so that solid particles carried along with the suction flow are deposited on the side of the filter that is oriented towards the dirt collection container. The flow resistance of the filter increases as the deposit of solid particles increases and so it has to be cleaned after some time. For cleaning purposes, the clean side of the filter oriented away from the dirt collection container can be acted upon by external air. To do so, an external air valve, starting from a closed valve position, can be moved to an open valve position and then back into the closed valve position again. This has the consequence that external air can flow briefly into the suction extraction line and act upon the clean side of the filter. This results in a mechanical shaking of the filter, with at least part of the incoming external air flowing through the filter in counterflow direction, i.e., counter to the flow direction prevailing during normal suction operation. This boosts the cleaning effect of the filter.

Vacuum cleaners of the kind mentioned at the outset are known from WO 2008/014798. Cleaning of the filter can be carried out by acting on the at least one filter with external air as briefly as possible, without this causing any noticeable interruption in the suction operation.

The object of the present invention is to develop the method of the kind mentioned at the outset and a vacuum cleaner for performing the method such that the at least one filter can be cleaned particularly effectively.

SUMMARY OF THE INVENTION

This object is accomplished in a method of the generic kind, in accordance with the invention, in that the suction power of the suction unit is increased before transfer of the external air valve to the open valve position and reduced again later.

In the method in accordance with the invention, the suction power of the suction unit can be changed in dependence upon the valve position of the external air valve. More particularly, the suction power of the suction unit is increased even before the external air valve transfers from its closed valve position to its open valve position. This has the consequence that the negative pressure prevailing the dirt collection container is increased before external air flows through the at least one filter in counterflow direction and enters the dirt collection container. Therefore, a particularly high negative pressure prevails in the dirt collection container at the point in time at which the external air valve transfers from its closed valve position to its open valve position. This has the consequence that the at least one filter is mechanically heavily shaken by the incoming external air, which to a large extent flows through it in counterflow direction. The cleaning of the at least one filter can thereby be increased. The suction power of the suction unit is preferably reduced again at the earliest at the point in time at which the external air valve moves from the closed valve position to the open valve position.

It is not absolutely necessary to increase the suction power before each filter cleaning. It may, for example, be provided that the suction power is increased, for example, only before every second or every third or, in general, every $n^{th}$ transfer of the external air valve to the open valve position, n being an integer greater than 1, whereas the suction power of the suction unit otherwise assumes a constant value.

It may also be provided that the suction power remains increased until the external air valve has moved several times from the closed valve position via the open valve position back again into the closed valve position. In such a configuration, the suction power is increased before a first transfer of the external air valve to the open position, and the external air valve then opens and closes briefly several times in succession. The opening time may, for example, be less than 0.5 seconds in each case. The suction power of the suction unit may remain increased during the repeated opening and closing movement of the external air valve.

Particularly effective filter cleaning is achieved, in an advantageous embodiment of the method in accordance with the invention, in that the suction power of the suction unit is increased before each transfer of the external air valve to its open valve position and reduced again later. Therefore, with each opening of the external air valve, a particularly high negative pressure prevails in the dirt collection container, and the entering external air can mechanically shake the at least one filter particularly strongly and flow through the at least one filter to a large extent in counterflow direction.

For particularly effective filter cleaning, it is important, in accordance with the invention, that when the external air valve transfers from the closed valve position to the open valve position, as high a negative pressure as possible prevails in the dirt collection chamber owing to a change in the suction power of the suction unit. This is expediently achieved by the suction power of the suction unit being increased when the external air valve transfers to the open valve position. The suction power of the suction unit can already be reduced again during the time interval in which the external air valve assumes an open valve position.

It is, however, particularly advantageous if the suction power of the suction unit remains increased during the entire time interval in which the external air valve is open. This makes it possible to keep the pressure increase accompanying the flowing of the external air into the dirt collection container as low as possible. This, in turn, has the advantage that the suction operation of the vacuum cleaner is not noticeably interrupted for the user during the filter cleaning.

The suction power of the suction unit is preferably reduced again at the earliest when the external air valve transfers to the closed valve position. It may also be provided that the suction power briefly remains increased even after the external air valve transfers to the closed valve position, so that external air that has flowed into the dirt collection container can be sucked off with increased suction power.

The suction power of the suction unit is increased before transfer of the external air valve to the open valve position preferably by at least 10%, in particular, by at least 30%.

In a preferred embodiment of the method in accordance with the invention, the supply energy provided to the suction unit is increased in order to increase the suction power of the suction unit. The suction unit may, for example, comprise an electric motor and a fan which is rotationally driven by the electric motor. The electric energy provided to the electric motor may be increased in order to increase the suction power.

It is particularly expedient if, in order to increase the suction power of the suction unit, the supply voltage provided to the suction unit is increased, i.e., the supply voltage of the electric motor of the suction unit is increased.

The suction power of the suction unit is preferably controlled electronically.

Expediently, the cleaning of the at least one filter is triggered manually, time-dependently or in dependence upon a sensor signal. It may, for example, be provided that cleaning of the filter is carried out automatically at regular or irregular time intervals, the suction power of the suction unit being increased before transfer of the external air valve to the open position and reduced again later. Here it may be provided that the external air valve is opened and closed several times in succession at short time intervals, so that external air can flow in surges into the suction extraction line and act upon the at least one filter on the clean side. The external air valve may then maintain its closed valve position until at a later point in time a cleaning process is carried out again, during which the external air valve is again briefly opened and closed several times in succession. The suction power of the suction unit may assume an increased value during the entire cleaning process. It is, however, particularly advantageous if the suction power of the suction unit is increased before each transfer of the external air valve to the open valve position and it then remains increased, at the most, until the external air valve assumes its closed position again. The suction power of the suction unit is thus varied in accordance with the opening and closing movement of the external air valve, it being increased, in each case, even before the external air valve transfers to the open valve position.

It may additionally or alternatively also be provided that the cleaning of the filter is triggered manually. This makes it possible for the user to carry out cleaning of the filter when he considers this necessary. If the cleaning of the filter is triggered manually, the suction power of the suction unit is first increased and only then is the external air valve briefly opened and closed again once or several times in succession, with the suction power of the suction unit being able to be varied in accordance with the movement of the external air valve. To manually trigger the cleaning, the vacuum cleaner may comprise an operating element actuatable by the user, for example, a switch or a push button.

It may also be additionally or alternatively provided that the cleaning of the at least one filter is triggered in dependence upon a sensor signal. For example, the pressure prevailing in the suction extraction line can be measured. If the flow resistance of the at least one filter increases on account of increasing deposit of solid particles, this results in a drop in pressure in the suction extraction line. If the negative pressure prevailing in the suction extraction line drops below a prescribed value, filter cleaning can be triggered.

It may also be provided that the operating noise and/or the rotational speed of the suction unit are detected by means of sensors. With a drop in pressure in the suction extraction line owing to clogging of the filter, the rotational speed of the suction unit increases and its operating noise changes, so that filter cleaning can be activated when a prescribed rotational speed is exceeded or when a prescribed operating noise occurs, for example, at a certain sound level.

At least one flow sensor, which detects the suction flow prevailing in the suction extraction line, for example, the flow velocity and/or the volumetric flow, may also be used. When these fall below a prescribed value, filter cleaning can be initiated.

It is particularly advantageous if the pressure drop prevailing at the filter is determined by means of sensors. For this purpose, pressure sensors may be arranged upstream and downstream of the at least one filter, so that the difference in the pressures prevailing upstream and downstream of the at least one filter can be detected. If the pressure difference exceeds a prescribed value, filter cleaning can also be triggered.

It may be provided that in addition to time-controlled and/or sensor-controlled triggering of filter cleaning, manual triggering thereof is possible. This allows the user to manually trigger filter cleaning, when required, independently of sensor signals and time-controlled filter cleanings.

In a particularly preferred embodiment of the method in accordance with the invention, supply energy from at least one rechargeable battery is provided to the suction unit at least from time to time. The at least one battery gradually becomes discharged during operation of the vacuum cleaner. In order to extend the discharge time as long as possible, it is expedient if the suction unit consumes as little energy as possible during normal suction operation. To heighten the cleaning effect, the supply energy made available to the suction unit is increased before transfer of the external air valve to the open valve position, and the supply energy is later reduced again. Therefore, the suction unit only has a relatively high energy consumption when the at least one filter is being cleaned. The operating time of the battery-driven vacuum cleaner can thereby be extended. The increased supply energy can be made available to the suction unit by a battery. However, an additional charge storage device may also be used. This is used as supplement to a battery in order to increase the supply energy of the suction unit for filter cleaning. In particular, a capacitor, preferably a double-layer capacitor, may be used as additional charge storage device. The capacitor may be charged gradually during normal suction operation, and the amplitude of the charging current can be selected relatively low, so that during battery operation the load on the battery owing to the charging of the capacitor is only low. For the filter cleaning, the capacitor can be discharged within a short time, with energy being made available by it to the suction unit in order to increase the suction power.

It may be provided that the vacuum cleaner can be selectively supplied with energy by a rechargeable battery carried with it or via a supply cable connectable to a mains voltage. A change in the suction power of the suction unit for the filter cleaning is preferably only made in the case of battery operation, whereas the suction power of the suction unit is kept constant for the filter cleaning in the case of mains operation of the vacuum cleaner.

As mentioned at the outset, the invention also relates to a vacuum cleaner for performing the aforementioned method. The vacuum cleaner comprises a suction inlet and a dirt collection container, which is in flow connection with a suction unit via at least one filter and a suction extraction line, and which can be subjected to negative pressure by the suction unit, wherein for cleaning purposes the at least one filter can be acted upon by external air on the clean side via at least one external air valve, which is movable from a closed valve position to an open valve position and back again into its closed valve position for cleaning the at least one filter.

In such a vacuum cleaner, the object mentioned at the outset is accomplished, in accordance with the invention, in that the suction power of the suction unit is increasable before transfer of the external air valve to the open valve position and reducible again later. Therefore, in the vacuum cleaner in accordance with the invention, the suction power can be varied in dependence upon the valve position of the external air valve. The suction power of the suction unit can be increased before transfer of the external air valve to the open valve position, so that an increased negative pressure forms in the dirt collection container before opening the external air valve, and, as a result, a particularly effective filter cleaning can be achieved by the external air subsequently flowing in. The suction power of the suction unit can be reduced again at a later point in time, so that the suction power of the suction unit can assume a lower value during normal suction operation than at the beginning of and preferably during filter cleaning. Expediently, the suction power of the suction unit is reducible again at the earliest at that point in time at which the external air valve is movable to the open valve position.

As explained above, it may be provided that the suction power of the suction unit is not increasable before each transfer of the external air valve to the open valve position but only upon each second, third or $n^{th}$ transfer of the external air valve to the open valve position, n being an integer greater than 1.

It may also be provided that the suction power of the suction unit is maintainable at an increased value during several successive movements of the external air valve from the closed valve position via the open valve position back into the closed valve position again.

It is particularly advantageous if the suction power of the suction unit is increasable before each transfer of the external air valve to its open valve position and reducible again later.

The suction power of the suction unit is preferably increased during the time interval in which the external air valve moves from the closed valve position via the open valve position back into the closed valve position. In such a configuration of the vacuum cleaner in accordance with the invention, the suction power of the suction unit may assume a high value during the entire movement time of the external air valve, starting from the closed valve position via the open valve position back into the closed valve position, whereas the suction power of the suction unit has a lower value during normal suction operation of the vacuum cleaner.

Expediently, the suction power of the suction unit is reducible at the earliest when the external air valve transfers to the closed valve position. It may also be provided that the suction power, after a previous increase, is only reducible again after the external air valve has already assumed its closed valve position.

The suction power of the suction unit is preferably increasable by at least 10%, in particular, by at least 30%.

It may be provided that the supply energy provided to the suction unit, in particular, the electric supply energy provided to an electric motor of the suction unit, is increasable in order to increase the suction power of the suction unit.

It is expedient if the supply voltage provided to the suction unit is increasable in order to increase the suction power of the suction unit. It may, for example, be provided that the suction unit has an electric motor, the supply voltage of which is increasable in order to increase the suction power of the suction unit.

In a preferred embodiment, the vacuum cleaner in accordance with the invention comprises an electronic control device for controlling the suction power of the suction unit. The electronic control device may comprise a circuit arrangement with a microcontroller.

Expediently, the suction power of the suction unit is controllable by the control device in dependence upon the valve position of the external air valve.

It is advantageous if the vacuum cleaner comprises an electronically controllable boost converter for increasing the supply voltage of the suction unit. Electronically controllable boost converters are known to one skilled in the art. By means of these, a direct current voltage or an alternating current voltage can be transferred to a higher level in dependence upon a control signal. Such boost converters are often also referred to as "boosters".

As mentioned above, it is advantageous if the cleaning of the at least one filter is triggerable manually, in a time-controlled manner or in a sensor-controlled manner. It may, for example, be provided that the vacuum cleaner in accordance with the invention comprises a manually actuatable operating element for triggering filter cleaning. Alternatively or additionally, it may be provided that the filter cleaning is carried out in a time-controlled manner. For this purpose, the vacuum cleaner may comprise a control device, which automatically triggers filter cleaning at time intervals, with the external air valve being opened and closed at least once, expediently several times briefly in succession. Alternatively or additionally, it may be provided that the vacuum cleaner comprises at least one sensor which provides a sensor signal for triggering filter cleaning. In particular, a pressure sensor may be used, by means of which the pressure prevailing in the suction extraction line is detectable. It is particularly advantageous if the vacuum cleaner in accordance with the invention comprises pressure sensors arranged upstream and downstream of the at least one filter, so that the pressure difference prevailing at the at least one filter is detectable, and filter cleaning is triggerable in dependence upon the pressure difference. Alternatively or additionally, the vacuum cleaner may comprise at least one flow sensor, which is preferably arranged in the suction extraction line, and/or a rotational speed sensor and/or a noise sensor.

Expediently, the vacuum cleaner in accordance with the invention comprises at least one rechargeable battery. This allows the vacuum cleaner to be operated independently of accessibility of a mains voltage. In order to keep the energy consumption of the vacuum cleaner low and nevertheless achieve particularly effective filter cleaning, the suction power of the suction unit assumes during normal suction operation a first value which is increased to a second value before transfer of the external air valve to the open valve position, and the suction power of the suction unit is reduced to the first value again at the latest after completion of the filter cleaning.

It is expedient if the vacuum cleaner comprises at least one charge storage device, in particular, a capacitor, preferably at least one double-layer capacitor, which can be charged during normal suction operation and which can be discharged within a short time via the suction unit in order to increase the suction power.

Preferably, the vacuum cleaner comprises at least one rechargeable battery for supplying energy to the suction unit, and, additionally, the vacuum cleaner comprises at least one double-layer capacitor for increasing the supply energy of the suction unit for filter cleaning.

It is particularly advantageous if the vacuum cleaner comprises in addition to at least one rechargeable battery a supply cable for connection to a mains voltage.

Preferably, the suction power of the suction unit is only changeable in dependence upon the valve position of the external air valve in the case of battery operation of the vacuum cleaner. In such a configuration of the vacuum cleaner, the suction power is independent of the valve position of the external air valve during mains operation, whereas the suction power is varied in dependence upon the valve position of the external air valve during battery operation in order to thereby extend the operating time of the vacuum cleaner during battery operation.

The following description of a preferred embodiment of the invention serves for further explanation in conjunction with the drawings.

DETAILED DESCRIPTION OF THE INVENTION

Figure 1:
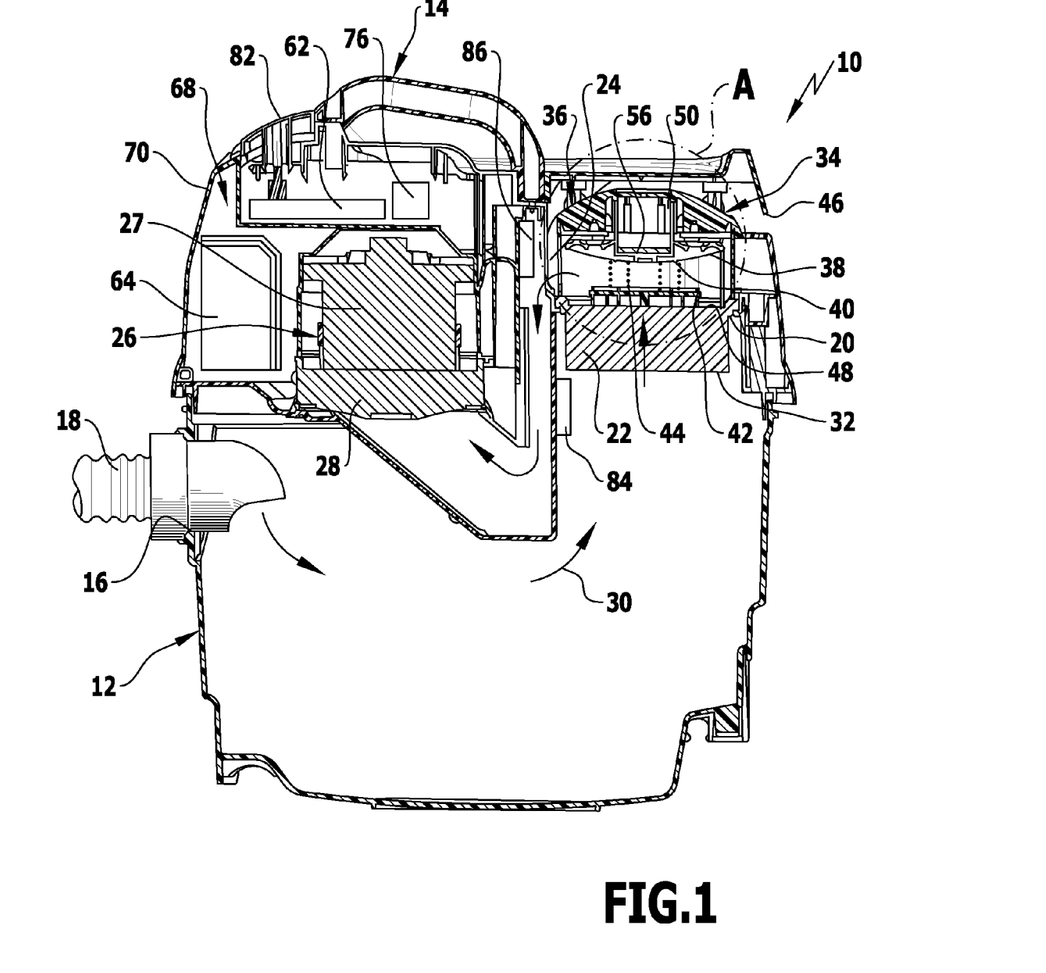
FIG. 1 shows a schematic sectional view of a vacuum cleaner in accordance with the invention.

Schematically represented in the drawings is a vacuum cleaner 10, with a dirt collection container 12, on which a suction head 14 is mounted. The dirt collection container 12 comprises a suction inlet 16, to which a suction hose 18 can be connected in the usual manner. The suction head 14 seals off the dirt collection container 12 on the upper side and forms a suction outlet 20, on which a filter 22 is held. Connected to the filter 22 is a suction extraction line 24, via which the dirt collection container 12 is in flow connection with a suction unit 26. The suction unit 26 comprises an electric motor 27 and a fan 28 rotationally driven by the electric motor 27.

The dirt collection container 12 can be subjected to negative pressure by the suction unit 26, so that a suction flow represented by arrows 30 in FIG. 1 is formed. Under the action of the suction flow 30, suction air laden with dirt can be sucked in via the suction inlet 16 into the dirt collection container 12 and then sucked off by the suction unit 26. The suction air can be emitted to the environment by the suction unit 26 via exhaust air openings, known per se to one skilled in the art, of the suction head 14, which are not shown in the drawings.

The suction air flows through the filter 22, so that solid particles that are carried along are deposited on the dirt side 32 of the filter 22, which is oriented towards the dirt collection container 12. It is, therefore, necessary to clean the filter 22 from time to time, as an increasing flow resistance, which impairs the suction action of the vacuum cleaner 10, is otherwise created.

Figure 2:
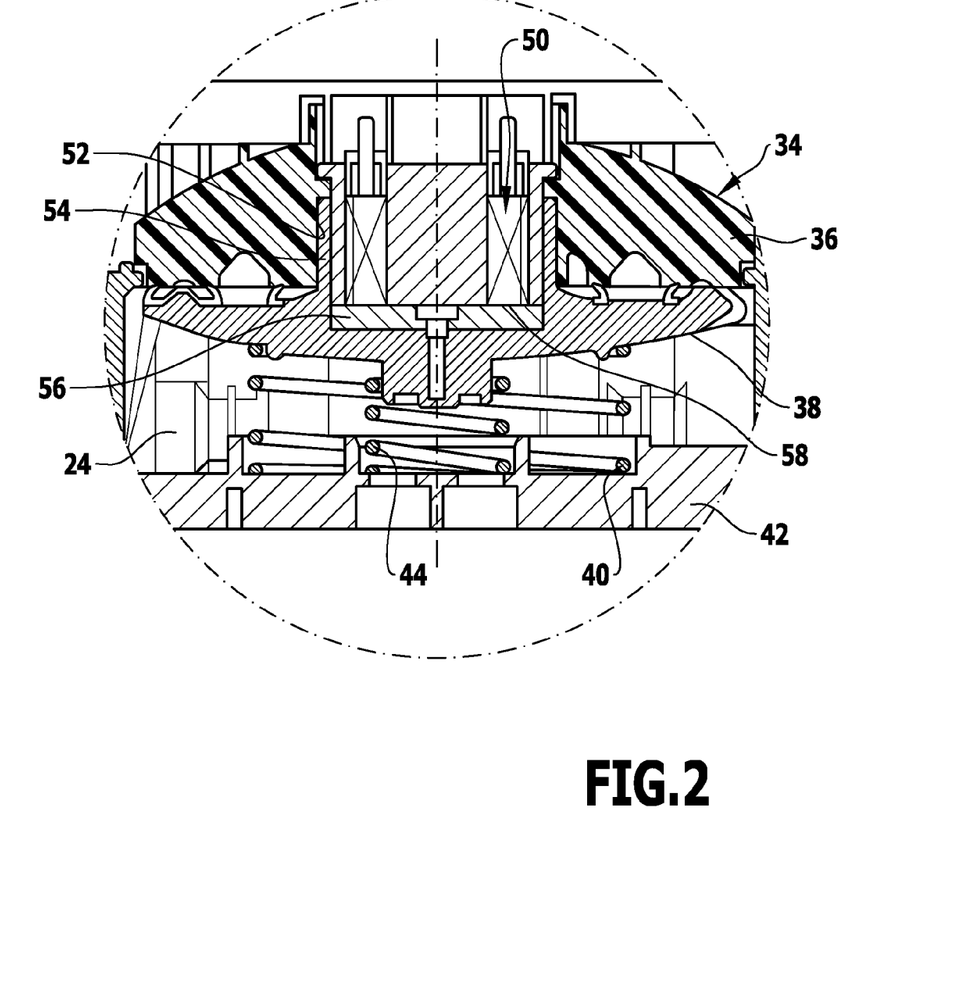
FIG. 2 shows an enlarged representation of an external air valve of the vacuum cleaner from FIG. 1.

For cleaning the filter 22, an external air valve 34, shown enlarged in FIG. 2, is arranged above the filter 22 in the suction head 14. It comprises a valve holder 36 which is fixedly arranged in the suction head 14 and forms a valve seat for a movable valve body in the form of a valve disk 38. The valve disk 38 is acted upon with a closing force in the direction towards the valve holder 36 by a closing spring 40. The closing spring 40 is restrained between a plate-like filter holder 42, having a multiplicity of flow passages and arranged fixedly in the suction head 14, and the valve disk 38. In addition to the closing spring 40, the filter holder 42 carries a resilient stop element in the form of a stop spring 44, which, like the closing spring 40, has a linear characteristic and is formed as a helical spring. In contrast to the closing spring 40, the stop spring 44 is not biased when the valve disk 38 is in the closed position. Only when the valve disk 38 lifts off from the valve seat of the valve holder 36, does the stop spring 44 enter into abutment with the underside of the valve disk 38 and become compressed somewhat upon further movement of the valve disk 38. It thereby exerts an increasing restoring force on the valve disk 38 and accelerates the movement of the valve disk 38, starting from its closed valve position shown in FIG. 2 via an open valve position back into the closed valve position again. In the open valve position, the valve disk 38 assumes a distance from the valve holder 36, which forms the valve seat.

The valve holder 36 has a multiplicity of through-openings, not represented in the drawings, the opening regions of which are closed by the valve disk 38 when it assumes its closed valve position. Level with the valve holder 36, the suction head 14 has a lateral opening 46. External air can flow into the through-openings of the valve holder 36 via the lateral opening 46. When the valve disk 36 assumes its open valve position at a distance from the valve holder 36, the lateral opening 36 is in flow connection with the suction extraction line 24 via the through-openings of the valve holder 36 and external air can act upon the clean side 48 of the filter 22 that is oriented away from the dirt collection container 12. When the valve disk 38 assumes its closed valve position, the flow connection between the lateral opening 46 and the suction extraction line 24 is interrupted.

In a central region, the valve holder 36 carries an electromagnet 50. The electromagnet 50 is surrounded in the circumferential direction by an annular space 52, which is entered by a guide sleeve 54 formed on the upper side of the valve disk 38. The guide sleeve 54 receives a magnetizable element in the form of an iron plate 56, which in the closed valve position of the valve disk 38 lies against a free end face 58 of the electromagnet 50 and in combination with the electromagnet 50 forms a closed magnetic circuit.

Figure 3:
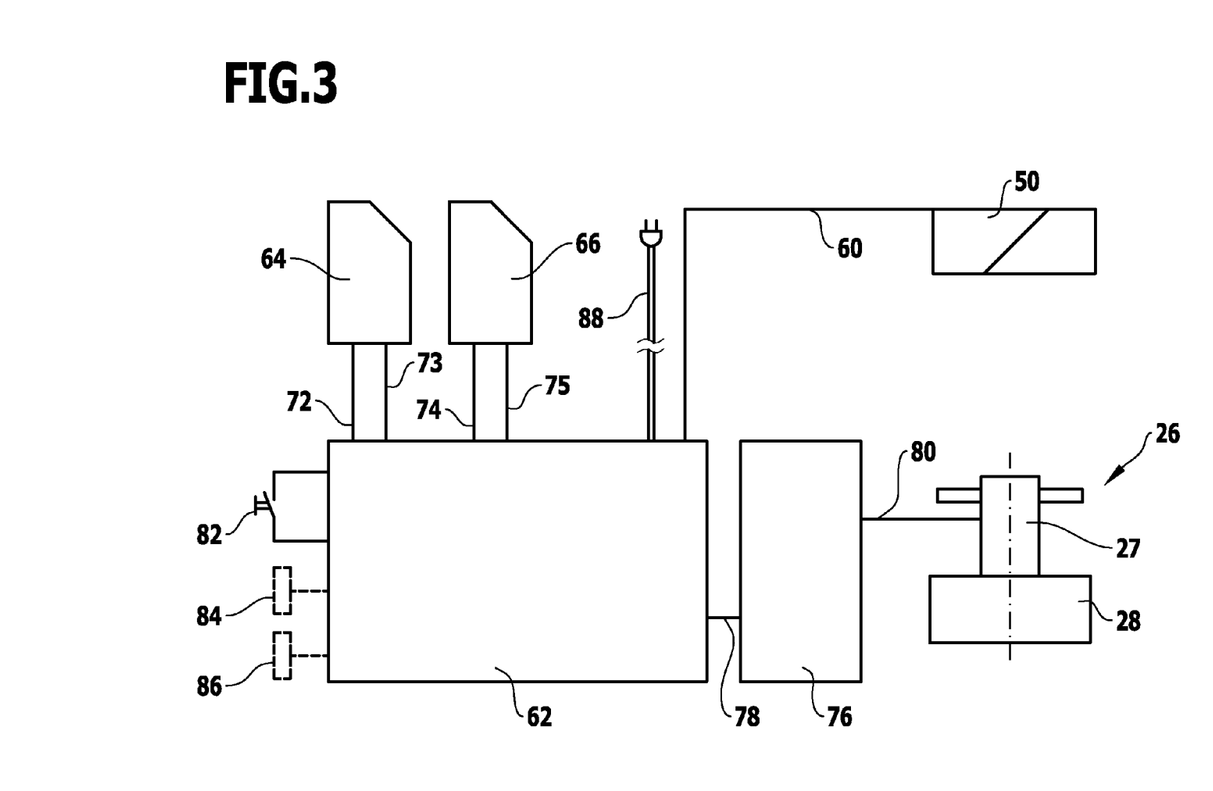
FIG. 3 shows a block diagram of the electrical control system of the vacuum cleaner from FIG. 1.

The electromagnet 50 is in electrical connection with an electronic control device 62 arranged in the suction head 14 via a current supply line 60 represented schematically in FIG. 3. During normal suction operation of the vacuum cleaner 10, a supply current is applied to the electromagnet 50 by the control device 62, which will be explained in more detail below, and the valve disc 38 is reliably held in its closed position on account of the magnetic field forming. The holding force of the electromagnet 50 is augmented by the spring force of the closing spring 40.

If the supply of current to the electromagnet 50 from the control device 62 is interrupted, the magnetic holding force acting on the valve disk 38 is no longer present, and the valve disk 38 is lifted off from the valve seat counter to the action of the closing spring 40, on account of the pressure difference acting on the valve disk 38, which is produced by the outside pressure of the external air present in the region of the valve holder 36 and the inside pressure within the suction extraction line 24. External air can then suddenly flow into the suction extraction line 24 through the through-openings of the valve holder 36, and the filter 22 is acted upon by external air in an impact-like manner on its clean side 48. This leads to the filter 22 undergoing mechanical shaking. In addition, external air flows through the filter 22 in the direction of counterflow, i.e., counter to the direction of flow 30 prevailing during normal suction operation. This has the consequence of effective cleaning of the filter 22.

In the illustrated embodiment, the vacuum cleaner 10 is supplied with energy by means of two rechargeable batteries 64, 66, which are arranged alongside the suction unit 26 in a battery compartment 68 of the suction head 14. The battery compartment 68 is accessible to the user for exchange of the batteries 64, 66 via a flap 70 which can be swivelled outwards.

The electronic control device 62 is arranged in the suction head 14 above the suction unit 26 and is in electrical connection with the batteries 64 and 66 via supply lines 72, 73, 74, 75. In addition to the electronic control device 62, the suction head 14 accommodates above the suction unit 26 an electronically controllable boost converter 76, which is in electrical connection via an input line 78 with the control device 62 and via an outlet line 80 with the electric motor 27 of the suction unit 26. At the input side, a push button 82 manually actuatable by the user and arranged on the upper side of the suction head 14 is connected to the control device 62. The user can trigger filter cleaning by actuating the push button 82.

Alternatively or additionally, it may be provided that a first pressure sensor 84 is arranged upstream of the filter 22 and a second pressure sensor 86 is arranged downstream of the filter 22, these being connected to the control device 62 and each providing a pressure-dependent control signal. The pressure difference arising at the filter 22 can be determined by means of the two pressure sensors 84 and 86. The more solid particles are deposited on the filter 22, the greater is the flow resistance of the filter 22 and the greater is also the resulting pressure difference. When the pressure difference reaches a prescribable value, the control device 62 can automatically trigger filter cleaning.

Alternatively or additionally, it may be provided that the control device 62 automatically triggers filter cleaning independently of the prevailing pressure conditions and independently of the possible actuation of the push button 82 at constant or varying time intervals.

Figure 4:
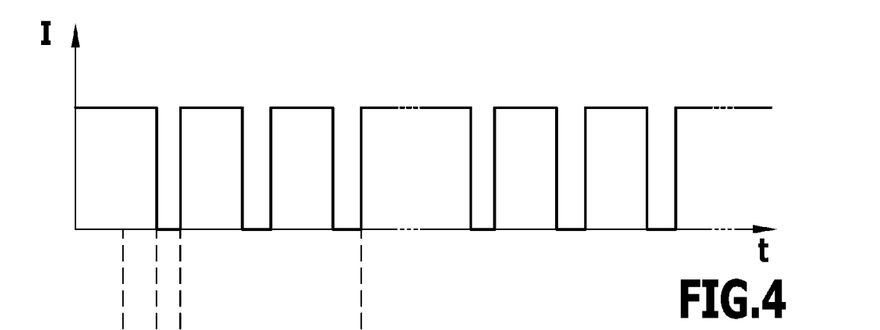
FIG. 4 shows an illustration of the time-related course of a control signal of a control device of the vacuum cleaner from FIG. 1 for controlling filter cleaning.

As mentioned above, filter cleaning is brought about by brief interruption of the supply of current to the electromagnet 50 by the control device 62. The time-related course of the supply current provided to the electromagnet 50 by the control device 62 is shown in FIG. 4. At a point in time $t_2$, the supply of current to the electromagnet 50 is interrupted, so that the external air valve 34, starting from its closed valve position, transfers to its open valve position, and at a subsequent point in time $t_3$, the supply of current to the electromagnet 50 is provided again, so that the external air valve 34 resumes its closed valve position. In the illustrated embodiment, the supply of current is interrupted three times in rapid succession, so that the clean side 48 of the filter 22 is acted upon three times in succession in an impact-like manner by external air, which to a large extent flows in the direction of counterflow through the filter 22. Solid particles adhering to the dirt side 32 thereby become detached. The cleaning process is completed at the end of the third current interruption, i.e., at the point in time $t_E$.

In the illustrated embodiment, a complete cleaning process therefore includes three opening and closing movements of the external air valve in rapid succession. The length of the time interval between the points in time $t_2$ and $t_3$ may, for example, be 90 milliseconds. Following a cleaning process, normal suction operation resumes again by supply current being applied to the electromagnet 50 by the control device 62 and the external air valve 34 maintaining its closed valve position. The suction power of the suction unit 26 is kept constant during normal suction operation. In the case of time-controlled filter cleaning, suction operation of, for example, 15 seconds is followed again by a cleaning process in which external air is supplied three times in an impact-like manner, as explained above. The length of the time interval between two cleaning processes is preferably manually adjustable. Alternatively or additionally, a cleaning process can be triggered manually by means of the push button 82 and/or in a sensor-controlled manner by means of the pressure sensors 84, 86.

Figure 5:
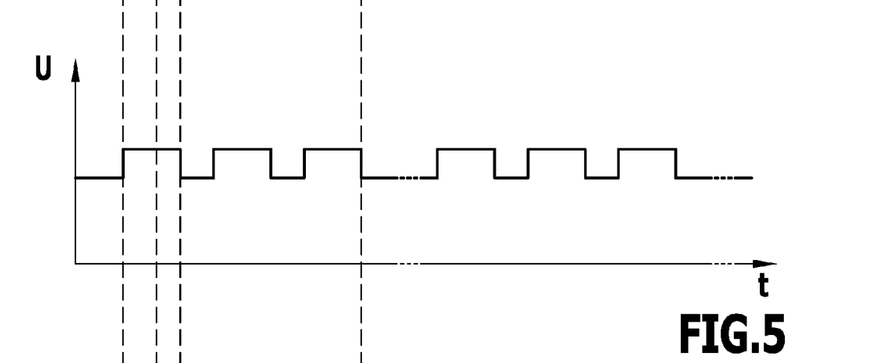
FIG. 5 shows an illustration of the time-related course of a control signal of the control device of the vacuum cleaner from FIG. 1 for controlling a boost converter.
Figure 6:
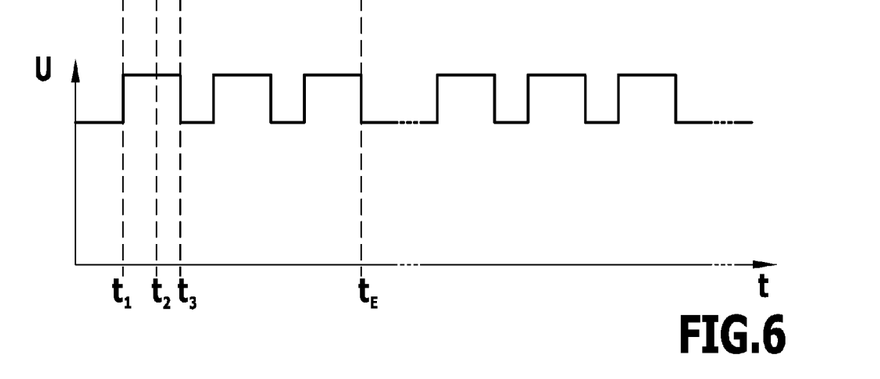
FIG. 6 shows an illustration of the time-related course of a supply voltage of a suction unit of the vacuum cleaner from FIG. 1.

FIG. 5 shows the time-related course of the input voltage provided to the electronically controllable boost converter 76 by the control device 62, and FIG. 6 shows the time-related course of the output voltage of the boost converter 76, which it provides in the form of a supply voltage to the electric motor 27. As is clear from FIGS. 5 and 6, the output voltage of the boost converter 76 and hence the supply voltage of the electric motor 27 is varied in dependence upon the current of the electromagnet 50 and hence in dependence upon the valve position of the external air valve 34. More particularly, the supply voltage of the electric motor 27 is increased at the point in time $t_1$, even before the supply current of the electromagnet 50 drops at the point in time $t_2$ and, as a result, the external air valve 34, starting from its closed valve position, transfers in an impact-like manner to its open valve position. In the illustrated embodiment, the increased supply voltage of the electric motor 27 is maintained until the supply current of the electromagnet 50 is applied again at the point in time $t_3$ and the external air valve 34, consequently, resumes its closed valve position. The increased supply voltage of the electric motor 27 has the consequence that the suction power of the suction unit 26 is increased as the rotational speed of the fan 28 is increased owing to the increased supply voltage of the electric motor 27. The length of the time interval between the points in time $t_1$ and $t_2$ may, for example, be 0.5 seconds to 1.5 seconds.

As is immediately clear from FIGS. 5 and 6, the supply voltage of the electric motor 27 is increased before each interruption of the supply current of the electromagnet 50, and the supply voltage of the electric motor 27 is reduced again to the original value each time the supply current of the electromagnet 50 is applied again. Owing to the increase in the suction power of the suction unit 26 as a result of the increase in the supply voltage, an increased negative pressure always forms in the dirt collection container 12 when filter cleaning is being performed, it being possible for the filter cleaning to be carried out in a time-controlled manner by means of the control device 62 or also in a sensor-controlled manner by means of the two pressure sensors 84 and 86 or also by manual actuation of the push button 82.

Alternatively, it may be provided that the supply voltage of the electric motor 27 remains increased throughout the entire cleaning process, i.e., in the time interval between the point in time $t_1$ and the point in time $t_E$ and is only lowered again at the end of the cleaning process.

The supply voltage of the electric motor 27 is increased for the filter cleaning to such an extent that the suction power of the suction unit 26 is increased by at least 10%, preferably by at least 30%.

As mentioned above, the vacuum cleaner 10 is supplied with energy by means of the two rechargeable batteries 64, 66. The energy consumption of the vacuum cleaner 10 can be kept relatively low by the change in the suction power of the suction unit 26, as provided in accordance with the invention, in dependence upon the valve position of the external air valve 34. The energy consumption of the vacuum cleaner 10 is only relatively high when filter cleaning is being carried out, as the suction power of the suction unit is increased, in each case, for this purpose before transfer of the external air valve 34 to the open valve position.

In addition to an energy supply by means of the rechargeable batteries 66 and 68, it may be provided that the vacuum cleaner 10 comprises a supply cable 88 with which the vacuum cleaner 10 can be connected to a mains voltage. The presence of a mains voltage at the supply cable 88 may be automatically recognized by the control device 62. When the vacuum cleaner 10 is supplied with mains voltage, the suction unit 26 can have a constant suction power by the supply voltage of the electric motor 27 being kept constant at a high level by the control device 62 providing the boost converter 76 with a constantly high input signal. In the absence of mains voltage, the vacuum cleaner 10 is supplied with energy by means of the batteries 64 and 66, and during battery operation of the vacuum cleaner 10 the change in the suction power of the suction unit 26, as explained above, occurs in dependence upon the position of the external air valve 34.

That which is claimed:

1. A method for cleaning at least one filter of a vacuum cleaner, wherein the vacuum cleaner comprises a suction inlet and a dirt collection container, which is in flow connection with a suction unit via the at least one filter and a suction extraction line, the at least one filter and the dirt collection container being subjected to negative pressure by the suction unit, wherein for cleaning purposes the at least one filter can be acted upon by external air on the clean side via at least one external air valve, which moves from a closed valve position to an open valve position and back again into the closed valve position for cleaning the at least one filter, and wherein the suction power of the suction unit is increased before transfer of the external air valve to the open valve position and the suction power of the suction unit is reduced again at a later point in time.

2. The method in accordance with claim 1, wherein the suction power of the suction unit is increased before each transfer of the external air valve to the open valve position and reduced again later.

3. The method in accordance with claim 1, wherein the suction power of the suction unit remains increased during the time interval in which the external air valve is open.

4. The method in accordance with claim 1, wherein the suction power of the suction unit is reduced again at the earliest when the external air valve transfers to the closed valve position.

5. The method in accordance with claim 1, wherein the suction power of the suction unit is increased by at least 10%, in particular, by at least 30%.

6. The method in accordance with claim 1, wherein the supply energy provided to the suction unit is increased in order to increase the suction power of the suction unit.

7. The method in accordance with claim 1, wherein the supply voltage provided to the suction unit is increased in order to increase the suction power of the suction unit.

8. The method in accordance with claim 1, wherein the suction power of the suction unit is electronically controlled.

9. The method in accordance with claim 1, wherein the cleaning of the least one filter is triggered manually, time-dependently and/or in dependence upon a sensor signal.

10. The method in accordance with claim 1, wherein supply energy from at least one rechargeable battery is provided to the suction unit at least from time to time.

11. A vacuum cleaner comprising a suction inlet and a dirt collection container, which is in flow connection with a suction unit via at least one filter and a suction extraction line, the at least one filter and the dirt collection container being subjected to negative pressure by the suction unit, wherein the at least one filter can be acted upon by external air on the clean side via at least one external air valve for cleaning purposes, wherein the external air valve is movable from a closed valve position to an open valve position and back again into the closed valve position for cleaning the at least one filter, and wherein the vacuum cleaner comprises an electronic control device for controlling the suction power of the suction unit, the electronic control device being adapted to increase the suction power of the suction unit before transfer of the external air valve to the open valve position and to reduce the suction power of the suction unit at a later point in time.

12. The vacuum cleaner in accordance with claim 11, wherein the suction power of the suction unit is increasable before each transfer of the external air valve to the open valve position and reducible again later.

13. The vacuum cleaner in accordance with claim 11, wherein the suction power of the suction unit is increased during the time interval in which the external air valve moves from the closed valve position via the open valve position back into the closed valve position.

14. The vacuum cleaner in accordance with claim 11, wherein the suction power of the suction unit is reducible again at the earliest when the external air valve transfers to the closed valve position.

15. The vacuum cleaner in accordance with claim 11, wherein the suction power of the suction unit is increasable by at least 10%, in particular, by at least 30%.

16. The vacuum cleaner in accordance with claim 11, wherein the supply energy provided to the suction unit is increasable in order to increase the suction power of the suction unit.

17. The vacuum cleaner in accordance with claim 11, wherein the supply voltage provided to the suction unit is increasable in order to increase the suction power of the suction unit.

18. The vacuum cleaner in accordance with claim 11, wherein the suction power of the suction unit is controllable by the control device in dependence upon the valve position of the external air valve.

19. The vacuum cleaner in accordance with claim 11, wherein the vacuum cleaner comprises an electronically controllable boost converter for increasing the supply voltage of the suction unit.

20. The vacuum cleaner in accordance with claim 11, wherein the cleaning of the at least one filter is triggerable manually, in a time-controlled manner and/or in a sensor-controlled manner.

21. The vacuum cleaner in accordance with claim 11, wherein the vacuum cleaner comprises at least one rechargeable battery.

\* \* \* \* \*